United States Patent
Eck

[11] 3,777,680
[45] Dec. 11, 1973

[54] FURNACE FOR COMBINED INCINERATION OF RUBBISH, GARBAGE, AND SEWAGE SLUDGE

[75] Inventor: John C. Eck, Convent, N.J.
[73] Assignee: Wilputte Corporation, Murray Hill, N.J.
[22] Filed: June 27, 1972
[21] Appl. No.: 266,688

[52] U.S. Cl. .................................. 110/12, 110/15
[51] Int. Cl. ............................................. F23g 3/02
[58] Field of Search.......................... 110/12, 15, 13; 34/171, 178

[56] References Cited
UNITED STATES PATENTS

| | | | |
|---|---|---|---|
| 976,175 | 11/1910 | Herreshoff | 110/12 |
| 2,015,052 | 9/1935 | Hartley | 110/12 |
| 2,107,127 | 2/1938 | Raisch | 110/12 |
| 2,119,601 | 6/1938 | Raisch | 110/12 |
| 2,744,477 | 5/1956 | Hartley et al. | 110/12 |
| 1,647,050 | 10/1927 | Mackay | 110/13 |

Primary Examiner—John J. Camby
Assistant Examiner—Henry C. Yuen
Attorney—Buell, Blenko & Ziesenheim

[57] ABSTRACT

The specification discloses a furnace of the multi-hearth type, comprising a lower combustion zone having a plurality of vertically spaced annular hearths and an upper drying zone having a plurality of vertically spaced annular hearths. The central area of the drying zone hearths is open and provides a passage for rubbish and garbage to fall directly from a hopper at the top of the furnace upon the uppermost hearth in the combustion zone. Rabbling apparatus moves the rubbish and garbage progressively from hearth to hearth and thence in ash form to a removal chute. The sewage sludge is deposited on the uppermost of the drying zone hearths and moved progressively downward by rabbling apparatus in a zig-zag path from hearth to hearth and then falls in a dry state to the uppermost hearth of the combustion zone, where it is incinerated along with the garbage and rubbish, and then removed in ash form via the removal chute. A forced air system for cooling the rabbling apparatus is also provided.

7 Claims, 1 Drawing Figure

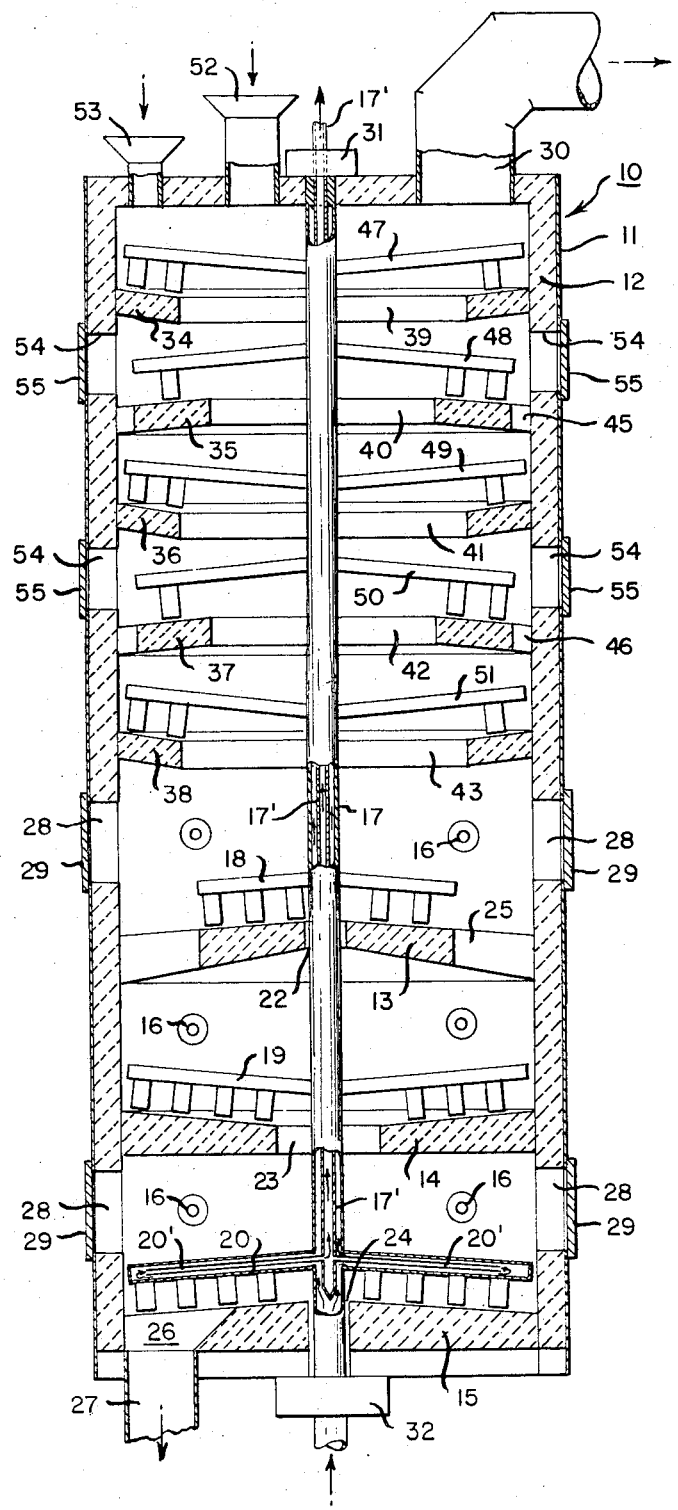

FURNACE FOR COMBINED INCINERATION OF RUBBISH, GARBAGE, AND SEWAGE SLUDGE

This invention relates to a furnace of the multihearth type employed for incineration of waste materials, and especially designed and adapted for combined incineration of rubbish, garbage and sewage sludge in a manner avoiding air pollution caused by quenching of the rubbish and garbage with the sludge.

Furnaces for incinerating waste materials, such as rubbish, garbage or sewage sludge, are well known. Such furnaces are commonly of the multi-hearth type having a plurality of annular hearths disposed in coaxial superposed relation, the waste material being moved by rabbling apparatus progressively downward from the topmost hearth to the bottommost hearth, whence the ash remaining is removed. U.S. Pat. No. 2,108,997 (Schilling); 2,121,661 (Hartley et al.) and Re 20,046 (Hartley) disclose furnaces typical of the furnaces of this type.

Such furnaces are, however, capable of use for incineration of one type of waste material only at any one time. They are not capable of combined incineration of sewage sludge and garbage, for example, since the incineration of filtered sewage sludge, containing about 75–80 percent water, concurrently with garbage would result in quenching of the garbage and consequent pollution of the air due to the smoke and noxious gases emitted from the furnace.

It is accordingly the object of this invention to provide a furnace of novel design and construction capable of employment to effect combined incineration of sewage sludge, of high percentage water content, and rubbish and garbage, without air pollution.

To accomplish the above object, I provide a multiple hearth furnace of novel construction having superposed combustion and drying zones, the annular hearths in the upper drying zone being superposed coaxially and providing a passage centrally thereof through which rubbish and garbage may fall by gravity from a hopper at the top of the furnace directly through the drying zone to the uppermost of a series of coaxially superposed hearths in the combustion zone. I further provide a separate hopper via which sewage sludge is deposited on the uppermost of the annular hearths in the drying zone, whence it is moved by rabbling apparatus progressively downwardly in a zig-zag manner over the series of hearths until it drops in a dried condition upon the uppermost of the hearths in the combustion zone.

I further provide means for circulating the combustion gases over the drying zone hearths and damper means for controlling admission of ambient air to the combustion zone of the furnace.

A presently preferred form of furnace embodying the invention will be described hereinafter in connection with the accompanying drawing, wherein the single FIGURE shows an elevational sectional view of the furnace.

Referring to the drawing, the multi-hearth furnace 10 shown comprises a structure or tower of essentially circular form. The walls of the furnace consist of an outer protective layer 11 of sheet metal and an inner layer 12 of ceramic or refractory material. Omitted, for simplicity, are the structural support members by which the walls, roof and floor of the furnace 10 are supported above the surface of the ground.

Furnace 10 is divided vertically into a combustion zone in the lower part thereof and a drying zone in the upper part thereof. Structurally supported within the combustion zone are a plurality of superposed hearths 13, 14 and 15, suitable oil or gas burners 16 extending into the combustion chambers above each hearth. Supported above each hearth by a central rotary shaft 17 are a plurality of radial rabbling arms 18, 19 and 20 respectively, the rabbles of which serve, by rotation of the rabble arms to progressively move the refuse material on the hearth toward the outer or inner periphery of the hearth in characteristic manner. As shown, hearths 13, 14 and 15 have central openings 22, 23 and 24 through which the rotary shaft 17 extends. Hearth 13 also has openings 25 at the outer periphery thereof through which the refuse material falls to the hearth 14 immediately below. The central opening 23 of hearth 14 is substantially larger in diameter than the shaft 17, thereby providing passage via which the refuse material falls to the hearth 15 immediately below. At the outer periphery of hearth 15 is opening 26, communicating with a chute 27 through which the ashes remaining from the combustion of the refuse material are deposited in a vehicle or on a conveyor for removal.

The furnace walls in the combustion zone are provided with a plurality of openings 28 having damper doors 29 which multiply serve to inspect the operation, replace or adjust rabbles or rabble arms and to adjust the amount of air admitted to the combustion zone in consequence of suction created by a blower (not shown) connected to the exhaust duct or pipe 30 opening out of the top or roof of the furnace. The arrow adjacent the duct 30 indicates the direction of exhaust flow of the combustion gases.

Rotary shaft 17 is rotationally supported by suitable bearing units 31 and 32 in the roof and floor structure of the furnace 10. Shaft 17 is rotated by a suitable motor (not shown) through a gear or chain drive in the manner exemplified in the prior art patents mentioned previously. Also, the shaft 17, which is hollow, communicates at its lower end with a blower (not shown) which provides flow of cooling air through the shaft for cooling the rabbling arms 18, 19 and 20 and other rabbling arms, as later to be described.

Structurally supported in superposed relation within the upper or drying zone are a plurality of hearths 34, 35, 36, 37 and 38. These hearths have central openings 39, 40, 41, 42 and 43 respectively, corresponding substantially in diameter and area to that of the uppermost hearth 13 in the combustion zone. The purpose of this relationship will be made apparent later on.

The hearths 35 and 37 are provided at the outer periphery thereof with a plurality of openings 45 and 46, respectively, through which refuse material may drop to the hearth below.

Associated respectively with each of the hearths 34, 35, 36, 37 and 38 are radially extending rabble arms 47, 48, 49, 50 and 51 attached to and rotated by the shaft 17.

A cooling arrangement is provided for the rabbling arms 18, 19 and 20 in the combustion zone and for the rabbling arms 47 to 51 of the drying zone. Each of the rabbling arms is hollow, as illustrated in connection with rabbling arm 20, and contains a coaxially extending tube (for example 20') communicating at its inner end with the tube 17' and open at its outer end to the interior of the rabbling arm. The flow of cooling air from the lower end of shaft 17 is closed off at the top of shaft 17. Thus under forced draft, cooling air is supplied into the rabbling arms and then out through the inner tube in each arm back to the central tube 17', whence it exits at the upper open end, as indicated by the arrows.

Mounted on the roof structure of the furnace and communicating with openings in the roof itself are two hoppers 52 and 53. The hopper 52 is substantially larger in cross-sectional area than hopper 53 and is located within a radius from shaft 17 such that rubbish and garbage deposited therein falls gravitationally through the central openings 39 to 43 of hearths 34 to 38 directly upon the uppermost hearth 13 of the combustion zone.

Hopper 53 is located at a greater radius from shaft 17 than hopper 52 and such that sewage sludge deposited therein falls directly on the uppermost hearth 34 of the drying zone.

The diameter of the central opening 39 in hearth 34 is somewhat larger than that of the central opening 40 of the hearth 35 immediately below. Thus, the sludge material is moved by the rabbles on rabble arms 47 toward the central opening and then falls directly upon the hearth 35 beneath. The rabbles on rabble arms 48 associated with hearth 35 thus move the sludge toward the outer periphery of the hearth, whence it falls through the openings 45 directly upon the hearth 36 beneath. Rotation of rabble arms 49 in turn moves the sludge inwardly over hearth 36 until it drops through opening 41 upon hearth 37 beneath.

Rotation of rabble arms 50 associated with hearth 37, in turn, cause radially outward movement of the sludge on the hearth 37 from which the sludge falls through openings 46 directly upon the hearth 38 beneath. The rabbles on rabble arms 51, in turn, cause movement of the sludge on hearth 38 toward the central opening 43, through which the sludge falls upon the hearth 13 beneath or through openings 25 in hearth 22 upon the intermediate hearth 14.

Similarly to the combustion zone, the drying zone has a plurality of openings 54 in the furnace wall covered by inspection doors 55, used to inspect the operation and replace or adjust rabbles or rabble arms.

The method of operation of the furnace 10 should be apparent in general from the foregoing description. However, a summary description of the operation will offer additional clarification.

Assuming that furnace 10 is conditioned for operation, that is with the combustion zone fired by burners 16 and with shaft 17 and the attached rabble arms rotating, garbage and other rubbish may be deposited in hopper 52 from which it falls directly upon hearth 13 within the combustion zone. From hearth 13 in the waste material is progressively advanced by operation of the rabbling arms 18, 19 and 20 until it falls, in ash form through chute 27 and is thence removed.

Sewage sludge, which may have about 75 to 80 percent water content, may be deposited in hopper 53 separately or concurrently with deposit of rubbish and garbage in hopper 52. In either event, the forced current of hot air from the combustion zone, initially created partly by heat supplied by the burners 16 and partly by the heat of combustion of the waste material itself, rising in the furnace through the drying zone and traveling over the hearths 34 to 38, to the exhaust duct 30 effectively evaporates, that is dries, the moisture from the sludge on the hearths in the drying zone.

By appropriate adjustment of damper doors 29, the moist sludge entering the drying zone is thoroughly dried, the water evaporated being carried along with the hot combustion gases out through exhaust duct 30. Accordingly, at the time the sludge drops from the lowermost hearth 38 in the drying zone upon the uppermost hearth 13 or hearths 13 and 14 of the combustion zone, the sludge has attained such a dry condition that "quenching" of the rubbish and garbage waste material on the hearths in the combustion zone does not occur. Consequently, the sludge is incinerated along with the waste material directly deposited through hopper 52, and its ash commingled with the ashes forced out through chute 27. Moreover, since the sludge is introduced into the combustion zone in a dry state, the ash residue from the combustion zone is entirely free of combustible material. Of special importance is the fact that the quenching of the rubbish and garbage in the combustion zone is avoided, thereby avoiding the production of noxious odors and air pollution caused by "quenching."

In the operation of the furnace, combustion heat must be supplied initially from the burners 16. However, as the waste material in the combustion zone becomes fired, the heat of combustion of the waste material is sufficient to continue the furnace operation without supplementary heat from the burners 16.

While I have illustratively shown and described a preferred form of the invention, it will be understood that modifications are possible within the terms of the following claims.

I claim:

1. Apparatus for incinerating waste material, comprising a furnace having a lower combustion zone and an upper drying zone, said lower combustion zone having a plurality of superposed hearths and rabbling means for agitating and advancing the waste material deposited in said combustion zone hearths from hearth to hearth and thence to an ash removal chute, said drying zone having a plurality of superposed hearths in annular form, the aligned central openings in which provide a passage via which waste material of non-sludge type may be dropped gravitationally directly upon the uppermost of the combustion zone hearths, a first hopper means via which to deposit waste material of the non-sludge type into said passage, a second hopper means via which to deposit waste material of the sludge type directly upon the uppermost of the drying zone hearths, and rabbling means for agitating and advancing the sludge type waste material from hearth to hearth within the drying zone to first effect drying thereof and then deposit upon the uppermost ones of said hearths in the combustion zone.

2. Apparatus for incinerating waste material according to claim 1, wherein means includes flow of combustion heat from the combustion zone over said hearths in said drying zone to effect drying of said sludge type waste, and damper means in the combustion zone of said furnace controls the degree of ambient air admitted to the combustion zone.

3. Apparatus for incinerating waste material according to claim 1, wherein said first hopper means is disposed inboard of the said second hopper means.

4. Apparatus for incinerating waste material according to claim 1, wherein a common drive means is provided for the said rabbling means in the combustion zone and the said rabbling means in the drying zone.

5. Apparatus for incinerating waste material according to claim 4, wherein said common drive means comprises a vertically disposed hollow shaft extending centrally through the hearths of the combustion zone and through the central openings of the hearths in the drying zone, and wherein means provides a flow of cooling air through said shaft.

6. Apparatus for incinerating waste material according to claim 5, wherein a hollow tube is supported coaxially within said hollow shaft, wherein said rabbling means comprises hollow rabbling arms communicating with the said hollow shaft, which rabbling arms have coaxially extending tubes therein open at their outer ends to the interior of the arms and connected at their inner ends to the said hollow tube, whereby cooling air is directed through the rabbling arms and to atmosphere out through the said hollow tube.

7. The method of incinerating waste material, including in part sewage sludge having a high percentage water content and in part rubbish and garbage having relatively low percentage water content, in the same furnace without production of noxious or air pollutant gases, which method comprises the steps of:

a. passing sewage sludge successively over a first series of superposed coaxial hearths by rabbling means while subject to an upward draft of hot air from a combustion zone beneath said hearths to effect drying of said sludge, b. depositing and passing rubbish and garbage successively over a second series of superposed coaxial hearths within the combustion zone in by-pass of the said first series of superposed coaxial hearths, c. depositing the dried sludge on the first one of the second series of superposed hearths within the said combustion zone and moving the combined waste material thereon by rabbling means in succession over the superposed coaxial hearths of said second series, and d. removing the ash remanence of said combined waste material from the last of the second series of hearths in the combustion zone.

* * * * *